United States Patent [19]

Schwartz

[11] Patent Number: 4,612,052

[45] Date of Patent: Sep. 16, 1986

[54] FLEXOGRAPHIC INK COMPOSITION

[75] Inventor: Mark E. Schwartz, Saint Paul, Minn.

[73] Assignee: Minnesota Mining and Manufacturing Company, St. Paul, Minn.

[21] Appl. No.: 693,994

[22] Filed: Jan. 23, 1985

[51] Int. Cl.$^4$ .............................................. C09D 11/12
[52] U.S. Cl. ........................................ 106/31; 106/20; 106/22; 106/23; 106/24; 106/30; 428/352
[58] Field of Search ................. 106/20, 27, 31, 22, 106/23; 428/352

[56] References Cited

U.S. PATENT DOCUMENTS 3,673,135 6/1972 Blake et al. .................... 260/17 A
3,681,105 8/1972 Milutin et al. .................... 117/15

FOREIGN PATENT DOCUMENTS 2140439 11/1928 United Kingdom .

OTHER PUBLICATIONS

Kodak Pub. No. GN-350, Jul. 1983.
Toyo Kasei Kogyo Co.-"Hardlen".
Kodak Publication No. GN-355, Nov. 1983.

*Primary Examiner*—Paul Lieberman
*Assistant Examiner*—John F. McNally
*Attorney, Agent, or Firm*—Donald M. Sell; James A. Smith; David L. Weinstein

[57] ABSTRACT

Ink composition comprising a conventional flexographic ink stock, a wax, and a chlorinated polyolefin. This ink composition can be used to print webs, e.g. tapes, bearing a low adhesion backsize on one major surface thereof and a pressure-sensitive adhesive on the other major surface thereof.

8 Claims, No Drawings

FLEXOGRAPHIC INK COMPOSITION

BACKGROUND OF THE INVENTION

This invention relates to inks, and, more particularly inks that are useful for printing on low adhesion backsize coatings.

Pressure-sensitive adhesive webs are well-established articles of commerce. In the form of tapes of varying width they are used to perform many functions including joining, mending, masking, sealing, splicing, protecting, reinforcing, identifying and decorating. Webs of larger width are often employed as coverings for walls and the like. A common procedure in handling a pressure-sensitive adhesive web is to wind it up in a roll with adjacent contact between adhesive-coated and adhesive-free sides, the web being unwound thereafter before use. In order to faciliate unwinding such a roll, the adhesive-free side of the web is usually coated with an appropriate "low adhesion" or release coating, often called a low adhesion backsize or LAB.

In many applications of pressure-sensitive adhesive webs, it is desirable to have a printed message or design on the adhesive-free side of the web. When some commonly available inks are used for such printing, a difficulty is encountered which arises from the tendency of the print to transfer to the adjacent adhesive-coated side when the web is unrolled, particularly if the printed web is retained in roll form for prolonged periods of time at elevated temperatures. When other commonly available inks are used, the adhesion of ink to the adhesive-coated side frequently is so strong that the web breaks when an attempt is made to unroll it. This is particularly the case when highly aggressive adhesives are used. In some instances adhesive separates from the adhesive-coated side and transfers onto the print. When it is attempted to overcome the aforementioned deficiencies by reducing the adhesive level of the pressure-sensitive adhesive, the usefulness of the product is seriously limited to applications which require only low bond strength. For example, adhesive tapes intended for reinforcing, joining or splicing would not be satisfactory if made in this manner.

Attempts have been made to modify the ink by the addition of natural or synthetic waxy materials, but such procedures have been unsatisfactory because such additives tend to migrate into the adhesive layer and cause a variety of deficiencies such as detackification and loss in adhesive and cohesive strength.

Another approach is to subject the printed side of the web, before rewinding, to an additional coating with an appropriate release agent but this involves cumbersome modifications in printing machinery and increased manufacturing costs.

SUMMARY OF THE INVENTION

An ink for printing on the low adhesion backsize coating of a low adhesion backsize coated pressure-sensitive adhesive web has now been found which makes possible winding and unwinding the printed web in the usual manner without transfer of ink to the adhesive-coated side or adhesive to the printed side. Briefly stated, the present invention comprises incorporating in a conventional flexographic ink stock composition an effective amount of a wax and an effective amount of a chlorinated polyolefin. Preferably, the ink of this invention contains per 100 weight percent of total composition: from about 10 to about 30 weight percent, and preferably 15 to 20 weight percent of a resinous binder; from about 5 to about 10 weight percent and preferably about 6 to about 8 weight percent of a coloring agent which can be inorganic or organic; from about 4 to about 7 weight percent and preferably about 5 to about 6 weight percent of the wax; from about 3 to about 12 weight percent and preferably about 4 to about 5 weight percent of the chlorinated polyolefin; and from about 55 to about 75 weight percent and preferably about 60 to about 70 weight percent of a conventional solvent for flexographic ink. Additional ingredients such as conventional ink modifiers can be added to this ink composition.

DETAILED DESCRIPTION OF THE INVENTION

Printing inks in general comprise coloring agents and liquid vehicles which comprise solutions of resinous binders in solvents. The specific choice of binders and solvents depends on several factors, such as, for example, the nature of the coloring agents and the nature of the substrate to be printed. The essence of the instant invention comprises incorporating into a conventional flexographic ink at least one wax and at least one chlorinated polyolefin.

Waxes that are suitable for the composition of the present invention include aliphatic alcohols having at least 10 carbon atoms; fatty acids having at least 12 carbon atoms, the metal salts thereof, and symmetrical ketones derived therefrom; fatty amides having at least 12 carbon atoms; fatty acid esters having at least 13 carbon atoms; and fluorocarbon polymers.

Suitable aliphatic alcohols can be represented by the formula $$R^1\text{-}CH_2OH$$

wherein $R^1$ represents a saturated or unsaturated hydrocarbon radical, e.g. alkyl, alkenyl, having 9 to 21 carbon atoms.

Representative examples of such suitable aliphatic alcohols include cetyl, stearyl, lauryl, myristyl, and mixtures thereof.

Suitable fatty acids can be represented by the formula

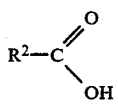

wherein $R^2$ represents a saturated or unsaturated hydrocarbon radical, e.g. alkyl, alkenyl, having 11 to 21 carbon atoms.

Representative examples of such fatty acids include palmitic, stearic, lauric, myristic, and mixtures thereof.

Suitable fatty amides can be represented by the formula

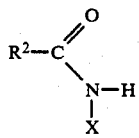

wherein $R^2$ is as defined above, and
X represents

or H.

When X is not H, the amide is, in actuality, an imide. Representative examples of such fatty amides include stearamide, lauramide, oleamide, ethylene-bis-stearamide and mixtures thereof.

Suitable fatty acid esters can be represented by the formula

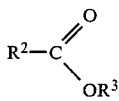

wherein
$R^2$ is a defined above, and
$R^3$ represents a saturated or unsaturated hydrocarbon radical, e.g., alkyl, alkenyl, having 1 to 22 carbon atoms, the hydrocarbon radical being unsubstituted or substituted with hydroxy groups.

Representative examples of such suitable fatty acid esters include glyceryl stearates, e.g. glyceryl monostearate and diethylene glycol monostearate, glycol stearates, cetyl palmitate, stearyl stearate, n-butyl stearate, n-octyl stearate.

Suitable symmetrical ketones can be represented by the formula

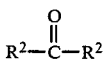

wherein
$R^2$ is as defined above.

Representative examples of symmetrical ketones derived from fatty acids include stearone and laurone.

Suitable metal salts of fatty acids can be represented by the formula

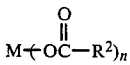

wherein
M represents a metal atom,
n represents an integer from 1 to 3, inclusive, and
$R^2$ is as defined above.

Representative examples of metal salts of fatty acids include octoates, laurates, palmitates, and stearates of aluminum, lead, cadmium, barium, calcium, lithium, magnesium, and zinc. The metal stearates are most preferred. Blends of metal salts of fatty acids, e.g. zinc stearate, and fatty acids, e.g. stearic acid, are also useful as anti-fouling agents in the composition of the present invention.

One or more of the hydrogen atoms of the hydrocarbon radicals $R^1$, $R^2$, $R^3$ can be replaced with other atoms, e.g., halide, or groups of atoms, e.g. hydroxyl, so long as said atoms or groups of atoms do not adversely affect the characteristics of the wax.

Suitable fluorocarbon polymers include polymeric tetrafluoroethylene.

Chlorinated polyolefins that are suitable for the composition of the present invention include chlorinated polyethylene, chlorinated polypropylene, chlorinated polybutylene, and mixtures thereof. Representative examples of commercially available chlorinated polyolefins include Eastman® CP 343-1 available from Eastman Chemical Products, Inc. and "Hardlen" 13-LP available from Toyo Kasei Kogyo Co., Ltd.

The wax and the chlorinated polyolefin can be added separately to the ink stock composition or can be mixed together before being added to the ink stock composition. Preferably the wax is dispersed in a suitable solvent, e.g. isopropyl alcohol, by means of ball-milling. The chlorinated polyolefin is generally commercially available dissolved in an organic solvent, e.g. xylene, toluene. The solvents used to disperse the wax and dissolve the chlorinated polyolefin should be compatible with those solvents in the flexographic ink stock composition.

Solvent systems commonly employed in the manufacture of flexographic inks are lower aliphatic alcohols, including propanol, isopropanol, ethanol and butanol; lower aliphatic esters, in particular ethyl acetate; and lower aliphatic ketones, in particular methyl ethyl ketone. Additional solvent systems for flexographic inks are described in Kirk-Othmer Encyclopedia of Chemical Technology, 3rd ed., Yol. 13, John Wiley & Sons (New York: 1981), p. 387. The amount and type of solvent are regulated so as to give the ink the desired drying speed and degree of penetration.

Binders for ink vehicles are commonly selected from rosin esters, synthetic film-forming polymers, polyamides, alkyd resins and proteins, including casein, gelatin and soy protein. The choice of binder depends upon the particular substrate used, each type of fibrous or film material having specific requirements for optimum adhesion, as is known to those of ordinary skill in the art.

Coloring agents can be organic or inorganic. Representative examples of coloring agents include dyes and pigments. The choice of suitable coloring agents is known to those of ordinary skill in the art.

In addition to the above-mentioned chief components, flexographic inks customarily contain various amounts of modifying agents selected from waxes such as beeswax or paraffin wax, drying oils such as linseed oil, castor oil, turpentine oil, menhaden oil or the salts of linoleic acid, oleostearic acid and the like with amines such as triethanolamine or hydroxypropylamine, as well as small quantities of so-called driers like cobalt resinate, cobalt linoleate or an aluminum soap of linseed or tung oil. The use of such modifying agents is a well-established art.

The ink composition should contain an effective amount of chlorinated polyolefin and an effective amount of wax. The concentration of chlorinated polyolefin can range from about 3 to about 12 weight percent, and preferably from about 4 to about 5 weight percent, of the composition. The concentration of wax can range from about 4 to about 7 weight percent, and preferably from about 5 to about 6 weight percent, of the composition.

If the concentration of chlorinated polyolefin is too high and/or if the concentration of wax is too low, the adhesive may pick ink off the backsize coating or adhesive may be transferred to the printed surface. If the concentration of chlorinated polyolefin is too low and/or if the concentration of wax is too high, the properties of the pressure-sensitive adhesive may be adversely affected. While not wishing to be bound by any theory, the chlorinated polyolefin is believed to prevent the wax from migrating to the pressure-sensitive adhesive and adversely affecting the functional properties of the adhesive.

Preferably, the concentration of ingredients of the ink composition is as follows:

| Ingredient | Amount (Percent by weight) | Preferred amount (Percent by weight) |
|---|---|---|
| Coloring agent | about 5 to about 10 | about 6 to about 8 |
| Resinous binder | about 10 to about 30 | about 15 to about 20 |
| Solvent | about 55 to about 75 | about 60 to about 70 |
| Chlorinated polyolefin | about 3 to about 12 | about 4 to about 5 |
| Wax | about 4 to about 7 | about 5 to about 6 |

The concentrations of coloring agent, resinous binder, and solvent can vary from the foregoing stated concentrations.

The ink composition of this invention is useful for printing on the low adhesion backsize coating of a low adhesion backsize coated pressure-sensitive adhesive web, e.g. a tape. The ink is particularly useful for printing on the backsize coating of the tape described in assignee's copending application Ser. No. 649,082 filed on even date herewith, and incorporated herein by reference.

EXAMPLE I

A flexographic ink was prepared using the following conventional flexographic ink stock formulation, the amounts of each ingredient being expressed in percent by weight. The conventional ink stock was "Flexotuf" Hard Black 84L0863 commercially available from Inmont Corporation.

| Ingredient | Amount (percent by weight) |
|---|---|
| Binder (mixture of polyamide and nitrocellulose) | 29.5 |
| Pigment | 11.4 |
| Wax | 0.7 |
| Solvent (mixture of methanol, ethanol, isopropanol, n-propanol, ethyl acetate, n-propylacetate) | 58.4 |

Additional wax was added to the flexographic ink stock as a 20% by weight dispersion of wax in isopropyl alcohol. The chlorinated polyolefin was added to the flexographic ink stock as a 25% by weight solution of chlorinated polyolefin in xylene. The compositions of inks containing various concentrations of wax and chlorinated polyolefin are shown in Table I along with the results of the tests used to evaluate the inks.

In runs 1–10, the film backing was 2.0 mil biaxially oriented polypropylene. In runs 1–8, one side of the backing was coated with a low adhesion backsize composition comprising 83 percent by weight polyvinyl N-octadecyl carbamate (as described in U.S. Pat. No. 2,532,011) and 17 percent by weight chlorinated polyolefin (Eastman ®CP 343-1 available from Eastman Chemical Products, Inc.). The tape used to test the inks in runs 1–8 is fully described in assignee's copending application, Ser. No. 694,082. In runs 9–10, one side of the backing was coated with a low adhesion backsize composition comprising polyvinyl N-octadecyl carbamate, but no chlorinated polyolefin was present. In runs 11–12, the film backing was unplasticized polyvinyl chloride, one side of which was coated with a low adhesion backsize composition comprising polyvinyl N-octadecyl carbamate, but no chlorinated polyolefin was present.

The side of each film backing opposite the side bearing the low adhesion backsize coating was coated with a pressure-sensitive adhesive, namely a conventional block copolymer system similar to those described in U.S. Pat. No. 3,239,478, incorporated herein by reference for the description of that adhesive. The pressure-sensitive adhesive was coated at a rate resulting in coating weights of 17 to 30 grams per square meter. The tapes were approximately 2 inches wide.

The tapes were printed with a standard printing logo. The tape was run through the printing apparatus (SIAT L3) at a rate of 100 yards per minute. In each run, the tape was heated to approximately 200° F., at which temperature the low adhesion backsize coating was softened. The heated tape was then printed with the ink. The printed tapes were wound into rolls and retained for 11 days at 120° F. After aging, the tapes were unwound by hand at a rate consistent with normal tape applications. The tapes were measured for adhesion, unwind force, and observed for ink transfer. The results are shown in Table I.

The following tests were used to evaluate the ink of the present invention:

Ink Removal Test

The printed indicia used in the test procedure covered 30 to 40 percent of the area of the tape backside.

The quantity of ink removed was determined subjectively by visual observation, and tapes exhibiting no more than about 5 percent ink removal by this test were considered acceptable.

Unwind And Adhesion Tests of Printed Tape

Unwind forces were measured as the tape is unwound from the backsize-coated roll after printing. The adhesion test was performed by unwinding a roll of tape coated in accordance with the invention and applying a length of the tape to a polished steel surface followed by removal therefrom.

Both of these tests are described in detail in the Seventh Edition of "Test Methods For Pressure Sensitive Tapes", copyright 1976, Pressure Sensitive Tape Counsel, Glenview, Illinois. The test for unwind force is designated PSTC-8, while the adhesion test is designated PSTC-1, in accordance with procedures outlined in the foregoing publication.

It is preferred for commercial purposes that unwind be 25 oz/in or lower. It is preferred that adhesion drop be 15% or lower.

The results of the foregoing tests are shown in Table I.

TABLE I

| | Composition of ink | | | Properties | | | | |
|---|---|---|---|---|---|---|---|---|
| | Flexographic ink stock plus solvents from wax and chlorinated polyolefin (%)[1] | Wax (%)[1] | Chlorinated polyolefin (%)[1] | Initially after printing | | 120° F. aged | | |
| Run | | | | Unwind[2] | Ink transfer[3] | Unwind[2] | Ink transfer[3] | Percent drop in adhesion |
| 1 | 100 | 0 | 0 | low | medium | low | medium | 1 |
| 2 | 94 | 3 | 3 | low | none | low | medium | 3.5 |
| 3 | 92 | 4 | 4 | low | none | low | low | 10 |
| 4 | 90 | 5 | 5 | low | none | low | none | 15 |
| 5 | 95 | 5 | 0 | low | none | low | low | 30 |
| 6 | 94 | 0 | 6 | high | high | high | high | 1 |
| 7 | 92 | 3 | 5 | low | none | low | medium | 9 |
| 8 | 85 | 5 | 10 | low | none | low | none | 7 |
| 9 | 90 | 5 | 5 | low | none | low | high | 6 |
| 10 | 100 | 0 | 0 | low | medium | low | high | — |
| 11 | 92 | 4 | 4 | medium | none | medium | none | — |
| 12 | 100 | 0 | 0 | medium | medium | medium | high | — |

[1]"%" means weight percent of total ink composition.
[2]Low means 7 to 12 oz/in; medium means 13 to 18 oz/in; high means 18 to 25 oz/in.
[3]None means no ink transfer; slight means 0 to 2½% ink transfer; medium means 2½ to 5% ink transfer; high means greater than 5% ink transfer.

The data in the foregoing table show that ink compositions containing from about 4 to about 5 percent by weight of wax and from about 4 to about 5 percent by weight of chlorinated polyolefin provides good unwind and ink transfer characteristics, while not adversely affecting adhesion properties to an appreciable extent.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Flexographic ink composition comprising from about 10 to about 30 percent by weight resinous binder, from about 5 to about 10 percent by weight coloring agent, from about 4 to about 7 percent by weight wax, from about 3 to about 12 percent by weight chlorinated polyolefin, and from about 55 to about 75 percent by weight solvent.

2. The composition of claim 1 wherein said wax is selected from the group consisting of aliphatic alcohols having at least 10 carbon atoms, fatty acids having at least 12 carbon atoms, fatty amides having at least 12 carbon atoms, fatty acid esters having at least 13 carbon atoms, symmetrical ketones derived from fatty acids having at least 12 carbon atoms, metal salts of fatty acids having at least 12 carbon atoms, and fluorocarbon polymers.

3. The composition of claim 1 wherein said chlorinated polyolefin comprises from about 4 to about 5 weight percent of the composition.

4. The composition of claim 1 wherein said wax comprises from about 5 to about 6 weight percent of the composition.

5. The composition of claim 1 wherein said resinous binder comprises from about 15 to about 20 weight percent of the composition, said coloring agent comprises from about 6 to about 8 weight percent of the composition, said wax comprises from about 5 to about 6 weight percent of the composition, said chlorinated polyolefin comprises from about 4 to about 5 weight percent of the composition, and said solvent comprises from about 60 to about 70 weight percent of the composition.

6. The composition of claim 1 wherein said chlorinated polyolefin is selected from the group consisting of chlorinated polyethylene, chlorinated polypropylene, chlorinated polybutylene, and mixtures thereof.

7. The composition of claim 1 wherein said wax is selected from the group consisting of aliphatic alcohols having at least 10 carbon atoms, fatty acids having at least 12 carbon atoms, metal salts of fatty acids having at least 12 carbon atoms, symmetrical ketones derived from fatty acids having at least 12 carbon atoms, fatty amides having at least 12 carbon atoms, fatty acid esters having at least 13 carbon atoms, and fluorocarbon polymers.

8. The composition of claim 1 wherein said chlorinated polyolefin is selected from the group consisting of chlorinated polyethylene, chlorinated polypropylene, chlorinated polybutylene, and mixtures thereof and said wax is selected from the group consisting of aliphatic alcohols having at least 10 carbon atoms, fatty acids having at least 12 carbon atoms, metal salts of fatty acids having at least 12 carbon atoms, fatty amides having at least 12 carbon atoms, fatty acid esters having at least 13 carbon atoms, and fluorocarbon polymers.

* * * * *

UNITED STATES PATENT AND TRADEMARK OFFICE
CERTIFICATE OF CORRECTION

PATENT NO. : 4,612,052

DATED : September 16, 1986

INVENTOR(S) : Mark E. Schwartz

It is certified that error appears in the above-identified patent and that said Letters Patent is hereby corrected as shown below:

Col. 4, line 27, "Yol." should read --Vol.--

Col. 8, line 55, "12 carbon atoms, fatty amides having" should read --12 carbon atoms, symmetrical ketones derived from fatty acids having at least 12 carbon atoms, fatty amides having--

Signed and Sealed this

Sixteenth Day of December, 1986

Attest:

DONALD J. QUIGG

Attesting Officer

Commissioner of Patents and Trademarks